(12) United States Patent
Vieczorek, Jr.

(10) Patent No.: US 8,789,286 B1
(45) Date of Patent: Jul. 29, 2014

(54) BUILDER'S LAYOUT TAPE WITH NAIL TEMPLATE

(76) Inventor: John Vieczorek, Jr., Tunkhannock, PA (US)

( * ) Notice: Subject to any disclaimer, the term of this patent is extended or adjusted under 35 U.S.C. 154(b) by 115 days.

(21) Appl. No.: 13/545,648

(22) Filed: Jul. 10, 2012

(51) Int. Cl.
*G01B 3/10* (2006.01)

(52) U.S. Cl.
USPC .................................. 33/758; 33/755; 33/760

(58) Field of Classification Search
USPC ........................................... 33/758, 755, 760
See application file for complete search history.

(56) References Cited

U.S. PATENT DOCUMENTS

| | | | |
|---|---|---|---|
| 2,778,118 A | | 1/1957 | Manville |
| 2,854,753 A | * | 10/1958 | Caparros ........................ 33/762 |
| 3,648,835 A | | 3/1972 | Yucel |
| 4,281,461 A | * | 8/1981 | Roe .................................. 33/760 |
| 4,551,847 A | * | 11/1985 | Caldwell ........................ 33/755 |
| 4,697,349 A | * | 10/1987 | Lee .................................. 33/414 |
| 4,700,491 A | * | 10/1987 | Rhea, Jr. ......................... 33/494 |
| 4,890,392 A | * | 1/1990 | Komura et al. ................ 33/762 |
| 4,942,670 A | | 7/1990 | Brandt |
| 4,944,097 A | * | 7/1990 | Kang ............................... 33/760 |
| 5,010,656 A | * | 4/1991 | Broselow ........................ 33/759 |
| 5,743,021 A | * | 4/1998 | Corcoran ........................ 33/762 |
| 6,012,228 A | * | 1/2000 | Fisanich ......................... 33/289 |
| 6,145,215 A | * | 11/2000 | Graston et al. ................. 33/759 |
| 6,826,845 B2 | * | 12/2004 | Pritchard ........................ 33/414 |
| 6,880,260 B2 | | 4/2005 | Baida |
| 7,617,616 B1 | * | 11/2009 | Berg ............................... 33/759 |
| 7,676,949 B1 | * | 3/2010 | Lungu et al. .................... 33/770 |
| 8,141,267 B2 | * | 3/2012 | Marquez ......................... 33/758 |
| 8,151,478 B2 | * | 4/2012 | Kenney ........................... 33/512 |
| 2006/0107546 A1 | * | 5/2006 | Pritchard ........................ 33/760 |
| 2007/0124950 A1 | * | 6/2007 | Wirtz .............................. 33/759 |
| 2009/0126743 A1 | * | 5/2009 | Wingert .......................... 33/755 |
| 2010/0139110 A1 | * | 6/2010 | Germain ......................... 33/755 |
| 2010/0229412 A1 | * | 9/2010 | Kenney ........................... 33/512 |
| 2013/0055578 A1 | * | 3/2013 | Johns .............................. 33/760 |

* cited by examiner

*Primary Examiner* — Yaritza Guadalupe-McCall
(74) *Attorney, Agent, or Firm* — Crossley Patent Law; Micah C. Gunn

(57) ABSTRACT

A builder's layout tape with nail template that includes a measuring blade retractably extensible from within a circular housing wherein a plurality of holes are rendered at specific lengths along the measuring blade, each of said holes configured to receive a fastener therethrough, wherein the measuring blade may be secured to a desired position along a workpiece whereby specific relative distances are readily ascertained without the need of relaying or repeatedly resetting the measuring blade.

5 Claims, 3 Drawing Sheets

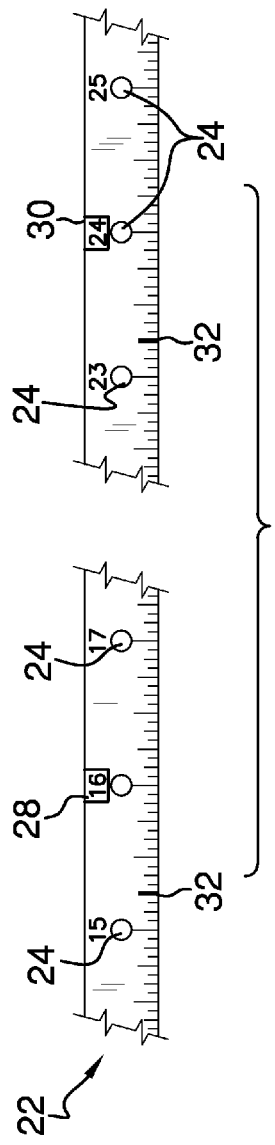
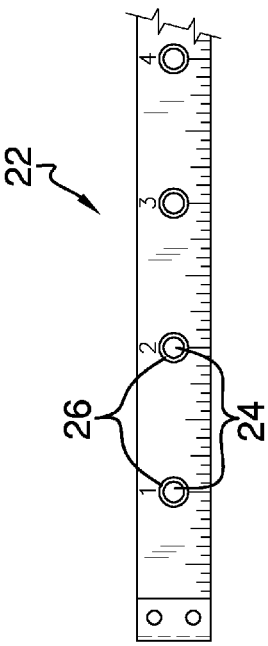
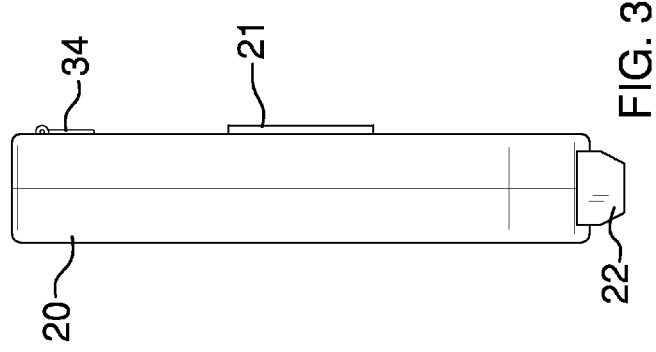

BUILDER'S LAYOUT TAPE WITH NAIL TEMPLATE

BACKGROUND OF THE INVENTION

Various types of builder's layout tapes and measuring tapes are known in the prior art. However, what is needed is a builder's layout tape with nail template that includes a measuring blade retractably extensible from within a circular housing wherein a plurality of holes are rendered at specific lengths along the measuring blade, each of said holes configured to receive a fastener therethrough, wherein the measuring blade may be secured to a desired position along a workpiece whereby specific relative distances are readily ascertained without the need of relaying or repeatedly resetting the measuring blade.

FIELD OF THE INVENTION

The present invention relates to a builder's layout tape with nail template, and more particularly, to a builder's layout tape with nail template that includes a measuring blade retractably extensible from within a circular housing wherein a plurality of holes are rendered at specific lengths along the measuring blade, each of said holes configured to receive a fastener therethrough, wherein the measuring blade may be secured to a desired position along a workpiece whereby specific relative distances are readily ascertained without the need of relaying or repeatedly resetting the measuring blade.

SUMMARY OF THE INVENTION

The general purpose of the builder's layout tape with nail template, described subsequently in greater detail, is to provide a builder's layout tape with nail template which has many novel features that result in a builder's layout tape with nail template which is not anticipated, rendered obvious, suggested, or even implied by prior art, either alone or in combination thereof.

Many measuring tapes are seen in the prior art. But what is needed is a builder's layout tape with nail template that includes a measuring blade retractably extensible from within a circular housing wherein a plurality of holes are rendered at specific lengths along the measuring blade, each of said holes configured to receive a fastener therethrough, wherein the measuring blade may be secured to a desired position along a workpiece whereby specific relative distances are readily ascertained without the need of relaying or repeatedly resetting the measuring blade.

The present builder's layout tape with nail template has been devised to enable a user to secure a measuring blade to a particular workpiece along a desired length whereby specific intervals, corresponding to standardized distances in construction, are readily ascertained. It can be frustrating to lay a measuring tape along said desired path and then have to reset or move the tape after making one mark to then again have to reset the tape. Moreover, when marking along a vertically disposed workpiece, the inability to secure current measuring tapes common to the art to a vertical surface renders a job more difficult.

The present builder's layout tape with nail template, therefore, incorporates means to attach the measuring blade to a specific workpiece enabling a user to render his marks along its length at the desired distances without fear of the tape falling, recoiling, moving, or otherwise losing position. Furthermore, accuracy is increased as, to once secured in position, the present builder's layout tape with nail template is immovable.

There is no adhesive required in the present builder's layout tape with nail template. Adhesives wear out over time and the construction environment, typically dusty, renders adhesives impotent when caked with dust, dirt, woodchips and the like. Many surfaces used in construction do not lend themselves to adherence to an adhesive anyway. Adhesives are also prone to rapid, unexpected release when tension is applied to a measuring tape and, when secured to a dusty surface, can detach at a crucial moment to much frustration and consternation.

The present builder's layout tape with nail template overcomes these problems, as will be described subsequently, by providing a more permanent means of securement to a workpiece. The present builder's layout tape with nail template, therefore, includes a measuring blade manufactured from a lightweight metal—potentially aluminum or titanium or other metal or allow—or a reinforced polymer such as a ployamide or para-aramid synthetic fiber or other plastic, wherein the measuring blade is durable, flexible, and strong enough to resist tearing when an extant nail is driven through any one of a plurality of holes disposed along said measuring tape's long axis. Each of said holes may be reinforced with a grommet circumferentially disposed within each of said holes wherein the edge of each hole is reinforced and protected from wear and tear during repeated use.

A user, then, extends the measuring blade from a circular housing, in the manner typical of many measuring tapes common in the art. Having lain the measuring blade along a desired distance across a workpiece or layout line, the user then secures the measuring blade thereto by means of at least one fastener driven through any one of the plurality of holes. Each of the plurality of holes is at least 0.5 cm (¹⁄₁₆ inches) in diameter and is centrally disposed at regular intervals along the length of the long axis of the measuring blade. In the preferred embodiment herein disclosed, each hole is disposed at 2.54 cm (1 inch) intervals. The center of each hole is, therefore, exactly one inch apart. A user, then, is able to secure the measuring blade to an exact position, as desired, and measure exactly from that secured point to another point demarked by the measuring blade. This is very useful when laying out joists, for example, among other examples pertinent to the standardized spacing of structures used in construction.

A red highlighted demarcation is disposed every 16 inches and a black highlighted demarcation is disposed every 24 inches upon the measuring blade to highlight said lengths for ready visibility and expedient apprehension of standardized distances spanning a length across which the present builder's layout tape with nail template is lain. Similarly, a linear denotation is disposed ¾ of an inch preceding each 16 inch and each 24 inch distance.

When a user is finished marking up a desired layout along a particular workpiece, he may simply remove the at least one fastener in the typical fashion and the measuring blade is thereafter rewound into the circular housing for later use, as desired.

Thus has been broadly outlined the more important features of the present builder's layout tape with nail template so that the detailed description thereof that follows may be better understood and in order that the present contribution to the art may be better appreciated.

Objects of the present builder's layout tape with nail template, along with various novel features that characterize the invention are particularly pointed out in the claims forming a

BRIEF DESCRIPTION OF THE DRAWINGS

Figures

FIG. 2 is a detail view of a measuring blade.
FIG. 3 is a front view.
FIG. 4 is a detail view of the measuring blade.

DETAILED DESCRIPTION OF THE DRAWINGS

Figure 1:
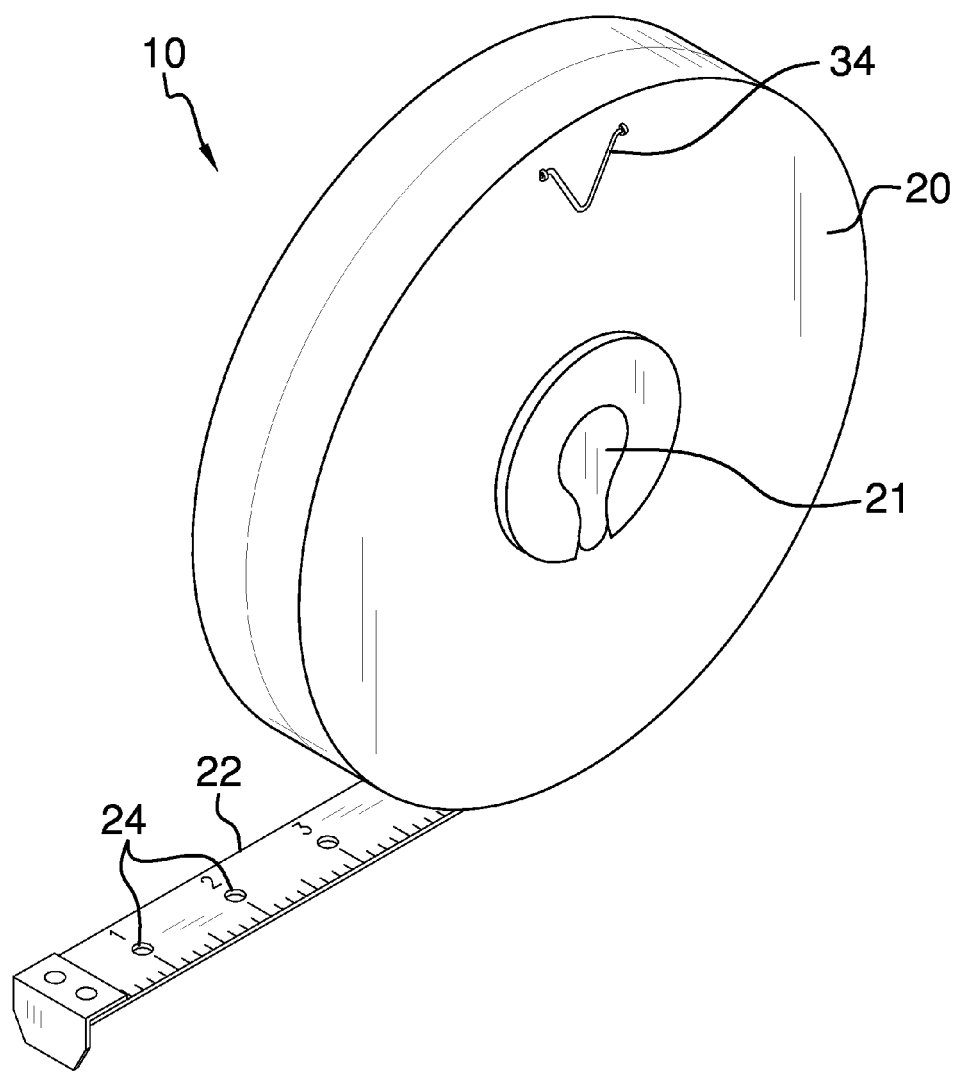
FIG. 1 is an isometric view.

With reference now to the drawings, and in particular FIGS. 1 through 5 thereof, example of the instant builder's layout tape with nail template employing the principles and concepts of the present builder's layout tape with nail template and generally designated by the reference number 10 will be described.

Referring to FIGS. 1 through 5 a preferred embodiment of the present builder's layout tape with nail template 10 is illustrated.

The builder's layout tape with nail template 10 has been devised to enable builders, carpenters, craftsman, and the like, to secure a measuring device along a desired length of a particular workpiece whereby the layout and marking of particular positions, lengths, and relative distances may be readily ascertained without relaying or resetting the measuring device.

The present builder's layout tape with nail template 10, therefore, offers a significant improvement over the prior art and is rendered with specific highlighted demarcations at specific increments of length corresponding to standardized spacings used in the construction industry, to engender easy-to-spot positions along the length of a section of a particular layout line.

The present builder's layout tape with nail template 10, therefore, includes a circular housing 20 from whence a reinforced measuring blade 22 is retractably extensible by means of a foldable winding handle 21. The measuring blade 22 has a plurality of holes 24, each hole 24 at least 0.5 cm (3/16 inches) in diameter, disposed at regular intervals along a central axis of the measuring blade 22. In the preferred embodiment herein disclosed, the center of each of the plurality of holes 24 is spaced exactly 2.54 cm (1 inch) apart and the center of each hole 24 is aligned with each one inch increment demarked upon the measuring blade 22.

Figure 5:
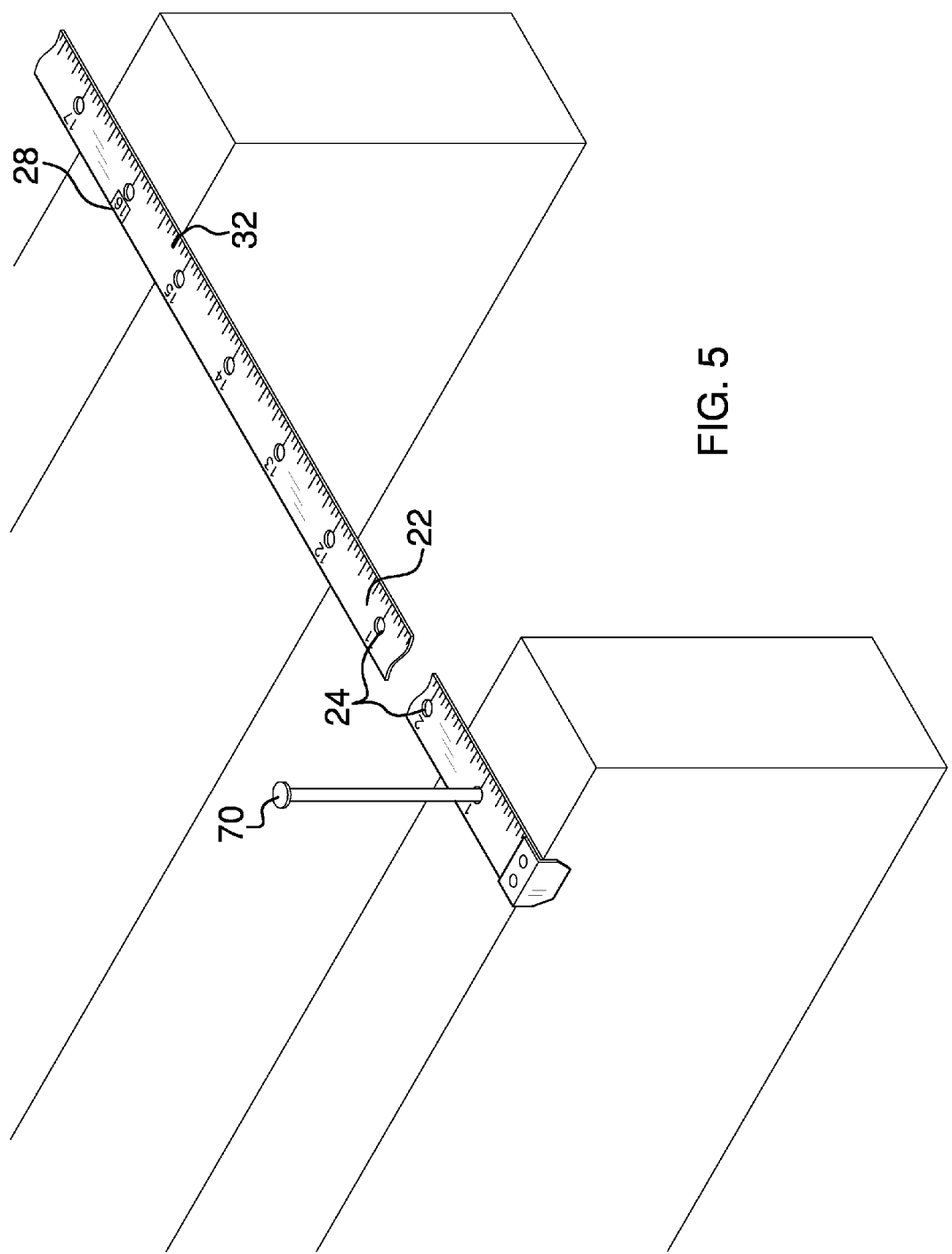
FIG. 5 is an in-use view.

A plurality of grommets 26 may be included circumferentially disposed within each of said holes 24 to reinforce each of the plurality of holes 24 whereby each of the plurality of holes 24 is configured to receive an extant nail 70 therethrough to secure the measuring blade 22 to a particular workpiece (see FIGS. 4 and 5).

A red highlighted demarcation 28 is disposed at 40.6 cm (16 inch) increments along the measuring blade 22 and a black highlighted demarcation 30 is likewise disposed at every 61 cm (24 inch) increments along the length of the measuring blade 22 (see FIG. 2).

A linear denotation 32 is disposed at each position 1.9 cm (¾ inch) preceding each 40.6 cm (16 inch) increment and at 1.9 cm (¾ inch) preceding each 61 cm (24 inch) increment, said denotations 32 configured to facilitate the placement of studs and trusses, for example, according to standardized spacings and dimensions common to the construction industry (see FIG. 2).

A hanger 34 is pivotally disposed upon the housing 20 to enable the housing 20 to be depended from an extant fastener during use, as desired, when, for example, working in an attic space above a false ceiling or straddling a joist previous to the installation of permanent flooring.

The measuring blade 22 may be manufactured from a lightweight metal, such as aluminum, titanium, steel, or another alloy as preferred. Alternately, the measuring blade 22 may be manufactured from a polymeric material such as para-aramid synthetic fibers or reinforced polyam ides or thermoplastics.

What is claimed is:

1. A builder's layout tape with nail template comprising a reinforced measuring blade retractably extensible from within a circular housing, said measuring blade having a plurality of holes disposed at regular intervals along a central axis of the measuring blade, each of said holes circumferentially reinforced and configured to receive an extant nail therethrough, wherein the measuring blade is fastenable to a workpiece by means of any of said plurality of holes releasably receiving a nail therethrough whereby the measuring blade is releasably secured along a desired measuring path, further including denotations at each position 1.9 cm (¾ inch) preceding each 40.6 cm (16 inch) increment and at each position 1.9 cm (¾ inch) preceding each 61 cm (24 inch) increment.

2. A builder's layout tape with nail template comprising:
a circular housing;
a reinforced measuring blade retractably extensible from within said housing;
a plurality of holes at least 0.5 cm (3/16 inches) in diameter disposed at regular intervals along a central axis of the measuring blade;
a plurality of grommets, each of said grommets disposed circumferentially within each of said plurality of holes to circumferentially reinforce each of the plurality of holes whereby each of the plurality of holes is configured to receive an extant nail therethrough;
a red highlighted demarcation disposed at every 40.6 cm (16 inch) increment and a black highlighted demarcation disposed at every 61 cm (24 inch) increment along the measuring blade;
a linear denotation at each position 1.9 cm (¾ inch) preceding each 40.6 cm (16 inc) increment 1.9 cm (¾ inch) preceding each 61 cm (24 inch) increment;
a hanger pivotally disposed upon the housing;
wherein the measuring blade is fastenable to a workpiece by means of any of said plurality of holes releasably receiving an extant nail therethrough whereby the measuring blade is releasably secured along a desired measuring path.

3. The builder's layout tape with nail template of claim 2 wherein the measuring blade is made of a metal.

4. The builder's layout tape of claim 2 wherein measuring blade is made of a flexible and durable polymer.

5. The builder's layout tape with nail template of claim 3 wherein the metal is selected from the group consisting of aluminum, titanium, and steel.

* * * * *